(12) United States Patent
Lettington

(10) Patent No.: US 6,259,414 B1
(45) Date of Patent: Jul. 10, 2001

(54) SCANNING APPARATUS

(75) Inventor: Alan H. Lettington, Reading (GB)

(73) Assignee: The Secretary of State for Defence, Farnborough (GB)

(*) Notice: Subject to any disclaimer, the term of this patent is extended or adjusted under 35 U.S.C. 154(b) by 0 days.

(21) Appl. No.: 09/403,201

(22) PCT Filed: Apr. 3, 1998

(86) PCT No.: PCT/GB98/00985

§ 371 Date: Oct. 15, 1999

§ 102(e) Date: Oct. 15, 1999

(87) PCT Pub. No.: WO98/47020

PCT Pub. Date: Oct. 22, 1998

(30) Foreign Application Priority Data

Apr. 16, 1997 (GB) .................................................. 9707654

(51) Int. Cl.⁷ .................................................. H01Q 3/00
(52) U.S. Cl. .................. 343/757; 343/758; 343/766; 343/781 P; 343/909
(58) Field of Search ................................. 343/757, 758, 343/761, 766, 781 P, 839, 909, 912; H01Q 3/00

(56) References Cited

U.S. PATENT DOCUMENTS

| | | | | |
|---|---|---|---|---|
| 4,042,933 | * | 8/1977 | Lapp | 343/761 |
| 4,434,799 | * | 3/1984 | Taenzer | 128/660 |
| 4,607,259 | * | 8/1986 | Dragone | 343/758 |
| 4,997,242 | | 3/1991 | Amos | 350/6.91 |
| 6,031,502 | * | 2/2000 | Ramanujam et al. | 343/761 |

FOREIGN PATENT DOCUMENTS

| | | |
|---|---|---|
| 0 226 273 | 6/1987 | (EP). |
| 2 452 724 | 10/1980 | (FR). |
| WO 95 18980 | 7/1995 | (WO). |

* cited by examiner

*Primary Examiner*—Don Wong
*Assistant Examiner*—Shih-Chao Chen
(74) *Attorney, Agent, or Firm*—Nixon & Vanderhye P.C.

(57) ABSTRACT

Scanning apparatus which scans input radiation from a scene and output radiation is transmitted to a receiver system, for example a millimetre wave imaging camera or a radar receiver by a rotatable reflective plate having an axis of rotation passing through the centre of its surface, secondary reflector and static reflector, wherein the secondary reflector is a second rotatable reflective plate having a common axis of rotation with the first rotatable reflective plate, wherein the common axis of rotation is inclined at a non-zero zero angle $\theta_b$ to the normal to the second reflective plate. The normal to the first rotatable plate is inclined at a small angle to the common axis of rotation, typically a few degrees and forms the secondary reflector. The static reflector may be a polarising roof reflector through which radiation is input to and output from the apparatus. The apparatus also includes a 45° Faraday rotator or a birefringent surface such as a Meander-line. An additional Faraday rotator and an inclined polariser may be included in the apparatus and arranged such that radiation output to the receiver system may be separated from the path of input radiation. Alternatively, the scanning apparatus may include a reflector lens arrangement, such that focused output radiation may be output directly to the receiver system.

28 Claims, 6 Drawing Sheets

SCANNING APPARATUS

BACKGROUND OF THE INVENTION

1. Field of the Invention

The invention relates to scanning apparatus which may be used in a real-time imaging system and, in particular, in a real-time passive millimetre wave imaging system. The scanning apparatus may also be used in other radiometry systems.

2. Discussion of Prior Art

British Patent No. 700868 (February 1952–December 1953) describes a twistreflector which relates to a similar field as the present invention.

Millimetre wave imaging is potentially useful as an all-weather surveillance and guidance aid but any practically useful system must be capable of imaging in real-time. This is not possible using existing systems. In a millimetre wave imager, radiation from the scene to be scanned is collected by means of a concave mirror or a lens and is focused onto an array of millimetre wave receivers. At present, large two-dimensional arrays of receivers which cover the whole of a required image are not available. Instead, a far smaller number of receivers is scanned across the image in order to build up the complete picture. A similar technique is used in some infrared imagers (for example EP 0226273).

Current millimetre wave imaging systems use mechanical scanning of one or several channels to synthesise an image. Ultimately, electronic scanning and staring array techniques could be developed to implement real-time millimetre wave imaging, although there are several problems associated with such a solution. Firstly, as the wavelength is necessarily long, in order to image under adverse weather conditions the system aperture must be large to gain adequate resolution. In some millimetre wave imaging systems the input aperture may be of the order of 1 m in diameter. Secondly, the cost per channel is high so that any electronically scanned or staring array technique is expensive. Furthermore, in the case of millimetre wave staring arrays there are fundamental problems analogous to the cold shielding problems encountered in infrared systems.

Another requirement of a practical millimetre wave imaging system is that it must be able to operate at TV-compatible rates (i.e. 50 Hz for the UK, 60 Hz for the USA). In the infrared, scanning systems are often plane mirrors flapping about an axis contained within their surface. This is not a practical option in the millimetre waveband as large aperture mirrors would be required to flap back and forth at TV-compatible rates, requiring a large change in inertia at the end of each scan.

In infrared imaging systems, where input apertures are typically only 10 mm in diameter, rotary systems have been used (EP 0226273). Furthermore, in the infrared, it is usual to employ afocal telescopes to match the field of view in the scene to that of the rotating polygon. This is impractical in high resolution millimetre wave imaging where the input apertures have considerably greater diameters and afocal telescopes would need to be excessively large.

Any scanning mechanism used in a millimetre wave imaging system must therefore be situated in either the object or the image plane. Furthermore, any scanning mechanism situated in the image plane must have good off-axis performance. This is difficult to achieve using existing technology.

Another known scanning method used in infrared imagers is a system of two discs rotating about axes which are slightly inclined to the normals to their faces. Radiation incident on the first disc is reflected at oblique incidence from the first rotating disc and passes to the second disc to experience a second reflection. By varying the orientation and relative speed of rotation of the discs, varying scan patterns can be achieved. Such a two-axis rotating disc system would not be ideal for use in millimetre wave imaging, however, as the system would be inconveniently large.

It is an object of the present invention to provide a compact object space scanning apparatus which may be used, in particular, to implement real-time millimetre wave imaging, or in radar systems. It is also an object of the invention to provide a scanning apparatus which has limited power requirements and minimum inertia and gives good off axis performance.

According to the present invention, apparatus for scanning radiation from a scene and for generating output radiation for input to a receiver system comprises;

a first rotatable reflective plate, for receiving and reflecting radiation, having an axis of rotation passing substantially through the centre of the plate, wherein the axis of rotation is inclined at a non-zero angle $\theta_a$ to the normal to the reflective plate, rotary means for rotating the reflective plate, secondary reflection means for receiving and reflecting radiation and static reflection means for receiving radiation reflected from the first rotatable reflective plate and reflecting radiation towards the secondary reflection means, characterised in that the secondary reflection means is a second rotatable reflective plate having a common axis of rotation with the first rotatable reflective plate, wherein the common axis of rotation is inclined at a non-zero angle $\theta_b$ to the normal to the second reflective plate.

The scanning apparatus provides the advantage of compactness. It has minimum inertia and minimum power requirements. The apparatus may be situated at the entrance pupil of an imaging camera or receiver and provides good off-axis performance.

SUMMARY OF THE INVENTION

The apparatus may also include a millimetre wavelength imaging camera or a radar receiver.

The normals to the first and second reflective plates are inclined in substantially the same plane and at substantially equal angles to the common axis of rotation and in substantially opposite directions. Typically, the angles of inclination $\theta_a$, $\theta_b$ may be between 1° and 10°.

The static reflection means may comprise a plane mirror having a reflective surface substantially parallel to the common axis of rotation.

In another embodiment of the invention, the secondary reflection means may be the first rotatable reflective plate. Typically, the axis of rotation may be inclined at an angle of between 1° and 10° to the normal to the reflective plate.

In this embodiment of the invention, the static reflection means may comprise two reflective surfaces inclined at substantially 90° to each other. Preferably, the two reflective surfaces form a roof reflector, such that the two reflective surfaces are in contact along an apex.

The apparatus may also comprise a polarising mirror arranged to reflect output radiation to the receiver system. The polarising mirror may be a sheet of plastic material comprising a plurality of parallel conducting wires, wherein the parallel conducting wires are oriented at substantially 45° to the apex of the roof reflector.

Alternatively, the static reflection means may comprise two polarisers, each having a polarisation axis, inclined at substantially 90° to each other. Preferably, the two polarisers form a polarising roof reflector such that the two polarisers are in contact along an apex and the polarisation axes of the polarisers are oriented to transmit radiation having substantially the same direction of polarisation, wherein said direction of polarisation is substantially parallel or substantially perpendicular to the apex.

In an alternative arrangement, the static reflection means may comprise a plurality of polarising roof reflectors, each comprising two polarisers and each polariser having a polarisation axis, wherein said polarisers are inclined at substantially 90° to each other and are in contact along an apex, wherein the polarisation axes of the polarisers forming each roof reflector are oriented to transmit radiation having substantially the same direction of polarisation wherein said direction of polarisation is substantially parallel or substantially perpendicular to the apexes.

The apparatus may also comprise a first Faraday rotator, situated between the polarising roof reflector and the rotatable disc, for rotating the direction of polarisation of radiation through substantially 45° each time the radiation passes through the Faraday rotator, such that the radiation having a particular direction of polarisation may be output through the polarising roof reflector.

Alternatively, the apparatus may comprise one or more birefringent surfaces, such as a Meanderline, situated between the polarising roof reflector and the rotatable disc, for receiving radiation in a state of polarisation, $P_s$, whereby the one or more birefringent surfaces introduce a substantially 90° phase shift in the state of polarisation, $P_s$, each time radiation passes through the one or more birefringent surfaces, such that radiation having a particular direction of polarisation may be output through the one or more polarising roof reflectors.

The apparatus may also comprise means for selectively transmitting radiation input to the apparatus having a particular direction of polarisation and for selectively reflecting radiation output from the apparatus having a particular direction of polarisation to the receiver system.

For example, the apparatus may comprise;

a second Faraday rotator for rotating the direction of polarisation of radiation output from the polarising roof reflector through substantially 45° and may also comprise a second polariser, wherein the second polariser has an axis of polarisation inclined at substantially 45° to the apex of the polarising roof reflector.

Alternatively, the apparatus may comprise a lens arrangement for selectively transmitting and focusing radiation having a particular direction of polarisation. The lens arrangement may be a reflector lens comprising a first polarising surface having a polarisation axis, for selectively transmitting and selectively reflecting radiation having a particular direction of polarisation, a second surface for rotating the direction of polarisation of radiation through substantially 45° and a third polarising surface for selectively reflecting and selectively transmitting radiation, wherein the third polarisation axis makes an angle of substantially 45° with the first polarisation axis. This provides the advantage that radiation output from the apparatus is focussed and therefore may be output directly to a receiver system. The apparatus may comprise two or more such lens arrangements arranged in series.

In this embodiment of the invention, the static reflection means may form part of the lens arrangement, for selectively transmitting and focussing radiation having a particular direction of polarisation, the apparatus being arranged to provide a conical scanning apparatus.

In a particular arrangement of this embodiment of the invention the first polarising surface may have a substantially flat surface and the third polarising surface may have a substantially spherical surface having a radius of curvature, R, and the apparatus may also comprise a detector array forming part of a spherical surface having half the radius of curvature of the spherical surface of the third polarising surface and being concentric with it.

The apparatus may also comprise a corrector plate located between the rotatable disc and the third polarising surface for removing aberrations arising from an image formed at the detector array.

According to a second aspect of the invention, a reflector lens may comprise;

a first polarising surface having a polarisation axis, for selectively transmitting and selectively reflecting radiation having a particular direction of polarisation, a second surface for rotating the direction of polarisation of radiation through substantially 45° and a third polarising surface for selectively reflecting and selectively transmitting radiation, wherein the third polarisation axis makes an angle of substantially 45° with the first polarisation axis.

At least one of the first, second or third surfaces may have a curved surface.

BRIEF DESCRIPTION OF THE DRAWINGS

The invention will now be described, by example only, with reference to the following figures in which.

DETAILED DISCUSSION OF PREFERRED EMBODIMENTS

Figure 1:
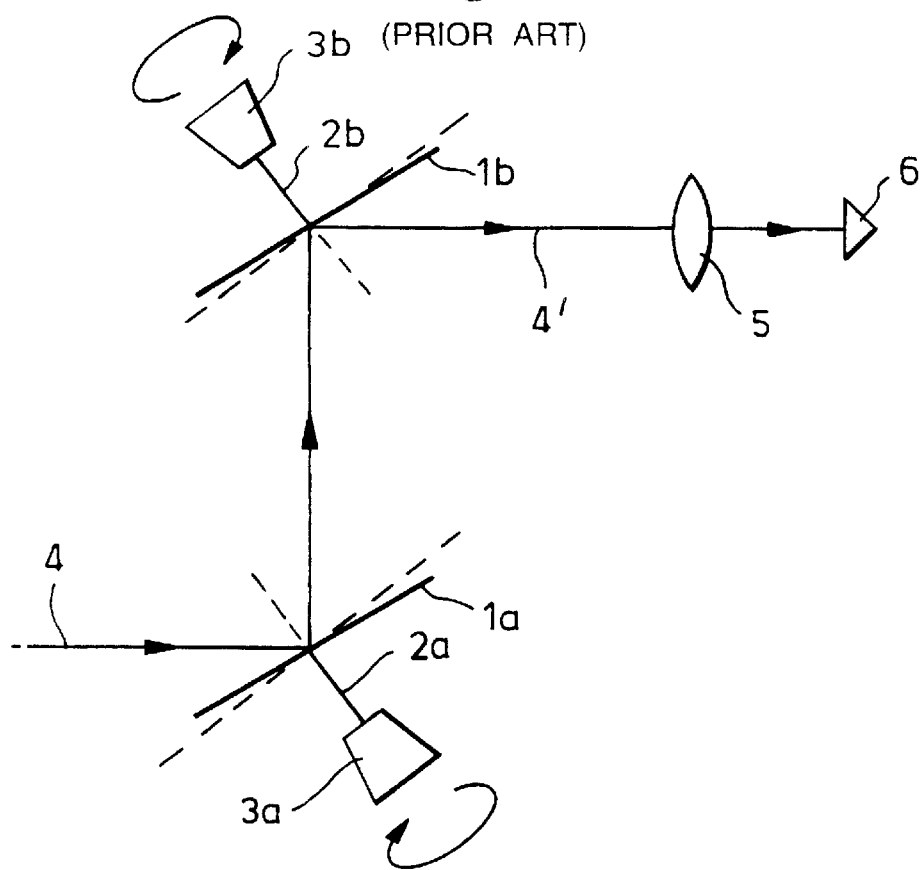
FIG. 1 shows a diagram of a conventional rotating two axis, two disc system.

Referring to FIG. 1, a conventional two disc rotating system comprises two discs 1a, 1b, each supported on a separate axis 2a,2b which is connected to a rotor mechanism 3a,3b. Each axis 2a,2b is inclined a few degrees to the normals to the faces of the discs 1a,1b. Typically the angle of inclination is 5°. As the discs 1a, 1b rotate about their respective axes, incident radiation 4 from the scene is incident on the first rotating disc 1a and is reflected at oblique incidence towards the second rotating disc 1b where it experiences a second reflection. From the second rotating disc 1b, radiation may be passed to an imaging or receiving system, typically comprising collection optics 5 and a receiver 6 (or receiver array). For example, the receiver 6 may be the receiver element of a millimetre wave imaging camera or the receiver element of a radar system.

Figure 2A:
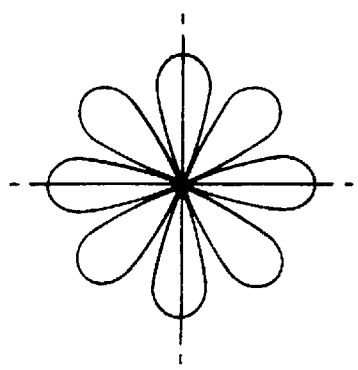
FIGS. 2(a) and 2(b) show examples of the scan patterns which may be achieved using the rotating two disc system in FIG. 1.
Figure 2B:
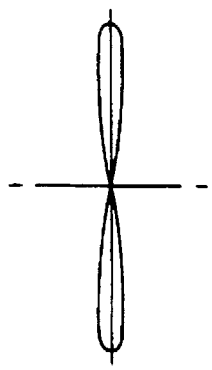

The two discs 1a,1b may be inclined at the same or different angles to the normal to the respective disc face and may rotate with the same or different speeds, depending on the scan pattern required at the imager. If the two discs 1a, 1b are inclined at different angles to their axes of rotation and are rotated at different speeds, a two-dimensional scan pattern will be achieved. If the angles of inclination of the two discs are the same, two discs rotating in the same direction give rise to a petal scan pattern, as shown in FIG. 2a. If the angles of inclination of the two discs are the same and the discs rotate at the same speed but in opposite directions an almost linear scan pattern may be achieved, as shown in FIG. 2b.

Figure 3:
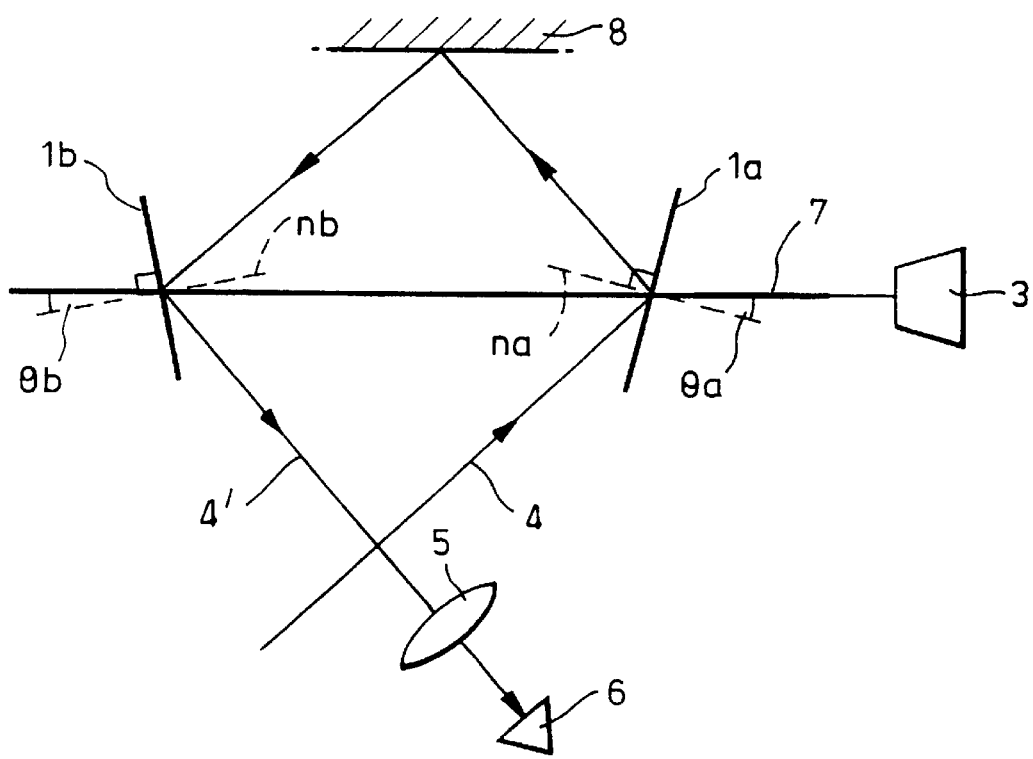
FIG. 3 shows the single axis two disc system of the present invention.

For operation at millimetre wavelengths the apparatus shown in FIG. 1 is required to be large and, furthermore, is rather complex. It is therefore impractical for use at these wavelengths. Referring to FIG. 3, a compact scanning apparatus, suitable for use in a millimetre wave imaging system, comprises two reflecting plates, for example discs 1a, 1b, supported on a single axis 7 passing through the centre of the surface of each disc 1a, 1b, a rotary mechanism 3 and a fixed, plane mirror 8. Radiation 4 from the image scene falls onto the first rotating mirror 1a. Any one direction of the incident radiation 4 undergoes a conical scan on reflection and falls onto the plane mirror 8. From the mirror 8 radiation is reflected to the second rotating disc 1b where it is reflected to the collection optics 5 of the imager. From the collection optics, radiation is focused to the receiver element 6 of the imaging system situated in the image plane of the focusing optics 5.

The normals, $n_a, n_b$, to the two discs 1a, 1b make an angle $\theta_a, \theta_b$ respectively to the axis of rotation 7. For the configuration shown in FIG. 3, where the discs 1a, 1b are inclined in opposite directions, the direction of the scan is perpendicular to the plane containing both the axis of rotation 7 and a normal to the plane of the mirror 8. If the two mirrors are tilted in the same direction, rather than in opposite directions, the direction of the scan is in the plane containing both the axis of rotation 7 and a normal to the plane of the mirror 8. Typically, the angles $\theta_a$, $\theta_b$ may be between 1° and 10°.

It is advantageous to have the angles of inclination ($\theta_a$, $\theta_b$) of the rotating discs 1a, 1b in the same plane and of substantially the same amount ($\theta_a = \theta_b = \theta$) but in opposite directions. In this case, the forces due to the tilt of the mirrors and their windage cancel on the axis of rotation 7. With the configuration shown in FIG. 3, the incident beam of radiation 4 is scanned through an angle of ±4θ (where θ is the angle of inclination of the mirrors to the normal to the axis of rotation 7). Therefore, for example, an inclination of 4° produces a total field of view of 32° in the scene.

After radiation 4' has been reflected from the two reflecting discs 1a,1b, it is focused by the collection optics 5 onto the receiver 6 of the imaging system. The receiver 6 may typically be one or more millimetre wave detectors in an array. A temporal encoded form of the image is recorded by the detector or detectors in the image plane and, from a knowledge of the scan pattern, a two dimensional image may be unfolded from the temporal encoded signal or signals.

For particular disc angular velocities and phases the resulting scan pattern is a raster scan. For reasons associated with the way the eye processes a moving image, a raster scan may be the most desirable form of scan. Furthermore, using a raster scan a linear array of detectors could be used, each detector recording one or several lines in the image. This architecture eases the unfolding of the data to form the required image.

For example, with the two discs (FIG. 3) rotating at the same speed, the resulting scan is a line scan in one dimension. The second dimension in the image may be formed by a linear array of detectors positioned at 90° to the line scan. In this case the number of image pixels in one direction would be the same as the number of detectors.

Figure 4:
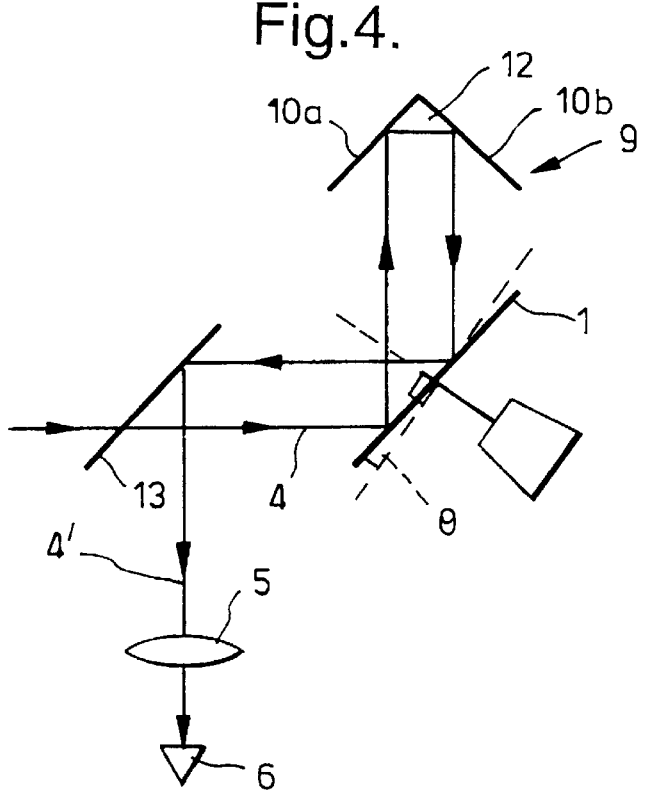
FIG. 4 shows a one disc scanning system comprising a roof reflector.

In an alternative embodiment of the scanning apparatus, the two rotating discs may be replaced with just one rotating disc 1, as shown in FIG. 4, further reducing the size of the entire apparatus. In this configuration, the apparatus also comprises a 90° (ρ/2) roof reflector 9.

Figure 5:
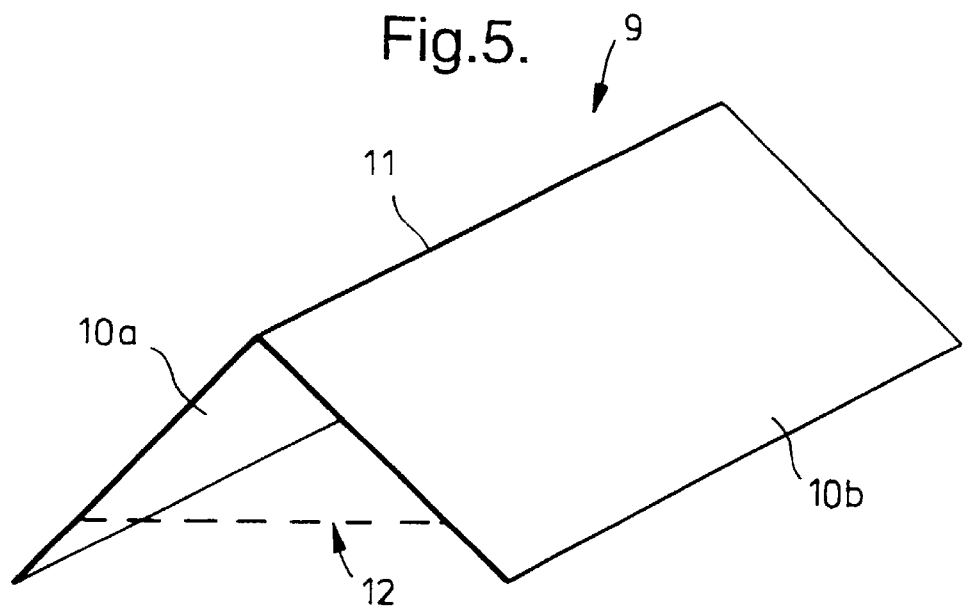
FIG. 5 shows a roof reflector.

The construction of the roof reflector 9 is described with reference to FIG. 5. The roof reflector 9 may comprise two flat reflective surfaces 10a, 10b which are inclined at substantially 90° to each other and are in contact along an apex 11. In the figure, a hypothetical line 12 is drawn between the two reflective surfaces 10a, 10b, wherein the line 12 is substantially orthogonal to the apex 11. The line 12 shall hereinafter be referred to as the line of intersection of the two surfaces 10a, 10b.

Referring to FIG. 4, radiation 4 from the scene is incident on the disc 1 and is reflected to the 90° (ρ/2) roof reflector 9 where it reflected back to the rotating disc 1 and then reflected to the collection optics 5 of the imaging system, via a beam splitter 13 which separates the path of incoming and outgoing radiation. Although it is preferable to separate the path of input radiation 4 from the path of output radiation 4', in some operating configurations it may not be essential and the beam splitter 13 may be omitted from the apparatus shown in the FIG. 4.

As in the previous example, the rotating disc is inclined slightly to the normal to the axis of rotation 6 by an angle θ. Typically, the angle of inclination, θ, may be 5°. Using this configuration, an almost linear angular scan (as shown in FIG. 2(b)) is achieved in a plane parallel to the line of intersection 12 of the two reflective surfaces 10a, 10b.

Although it is preferable to use a roof reflector in this arrangement, two independent reflective surfaces may also be used, where the two reflective surfaces are inclined such that they are at an angle of substantially 90° to each other but are not necessarily in contact. This arrangement, however, would result in a loss of some radiation reflected from the disc to the reflective surfaces.

The beam splitter 13 may be a conventional polarising mirror and provides a means of separating output radiation 4', for transmission to the imaging system, from input radiation 4. A conventional polarising mirror typically consists of a flat transparent plastic sheet with closely spaced, thin, parallel conducting wires. If the wires are oriented at an angle of 45° (ρ/4) to incident radiation, only 45° linear polarised radiation is transmitted. The parallel conducting wires of the polarising mirror are oriented at an angle of 45° to the incident radiation 4, and therefore only 45° linear polarised radiation therefore propagates to the roof reflector 9. Transmitted radiation is therefore incident at the roof reflector 9 with its polarisation inclined at 45° to the line of intersection 12 of the two reflective surfaces 10a, 10b. Radiation 4 experiences a 90° rotation of its direction of polarisation on reflection at the roof reflector 9 and is transmitted to the reflective disc.

Upon reflection from the rotating disc 1 for this second time radiation is therefore ρ/4 linearly polarised and is subsequently reflected by the polarising mirror 13 and passed to the collection optics 5. The polarising mirror 13 is therefore transparent for incoming radiation polarised in a direction perpendicular to the direction of the conducting wires and is reflective for incoming radiation polarised parallel to the direction of the conducting wires. The arrangement shown in FIG. 4 would therefore only allow a single polarisation to be detected at the receiver 6.

In this embodiment, the rotating disc 1 has to be over-dimensioned compared to the aperture of the collection optics 5, firstly because its axis of rotation is inclined to the direction of the incident and reflected beams and secondly because there is a significant displacement of the beam from its mean position as the mirror rotates about its axis.

Figure 6:
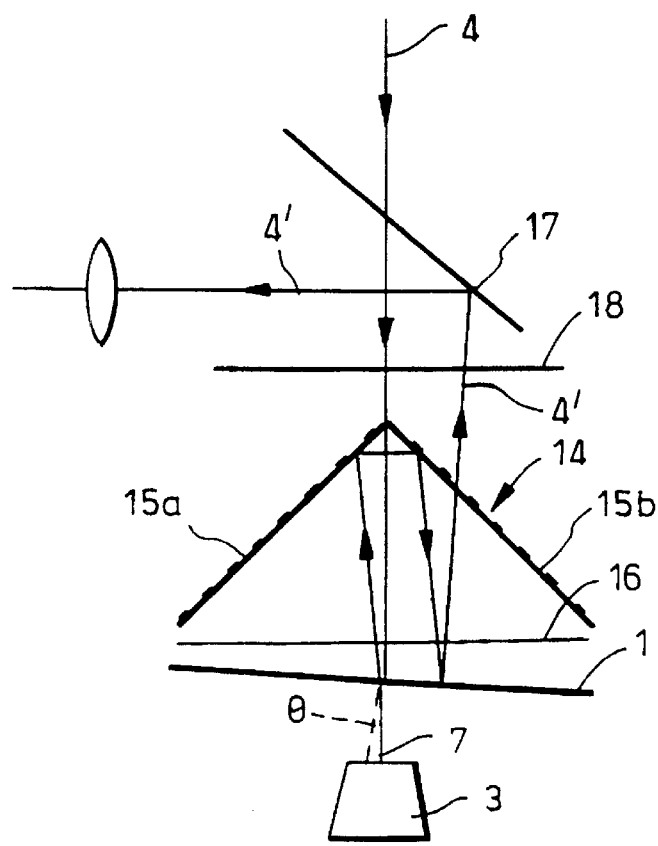
FIGS. 6 shows a compact one disc scanning systems comprising a polarising roof reflector.

Both of these effects may be overcome by placing the rotating disc 1 close to the roof reflector 9, as shown in FIG. 6. As in the previous examples, the normal to the rotating disc 1 is slightly inclined at an angle, θ, to the axis of rotation 7. In this configuration, the scanning apparatus includes a polarising roof reflector 14 comprising two substantially flat polarisers 15a, 15b inclined at substantially 90° to each other. The two polarisers 15a, 15b take the place of the two reflective surfaces 10a,10b in FIG. 5. The polarisers 15a,15b have polarisation axes oriented to transmit radiation having substantially the same polarisation and substantially parallel or perpendicular to the line of intersection 12 of the two polarisers 15a, 15b, therefore substantially perpendicular or parallel to the apex 11 (see FIG. 5). As mentioned previously, it would also be possible to use two independent polarisers in place of the polarising roof reflector, where the two polarisers are inclined at substantially 90° but are not necessarily in contact.

In this embodiment, the scanning apparatus also comprises a Faraday rotator 16 for rotating the direction of polarisation of radiation by 45° (ρ/4). Radiation incident on the Faraday rotator 16 undergoes a rotation in its direction of polarisation each time it passes through (i.e. 45° rotation per pass). Radiation 4 having one particular direction of polarisation is input through the roof reflector 14 to the Faraday rotator 16. Radiation is reflected by the rotating disc 1 and its direction of polarisation is therefore rotated by a further 45° as it is transmitted back through the Faraday rotator 16. The radiation is then reflected at the roof reflector 14 and experiences a further total rotation in its direction of polarisation of 90° as it passes back and forth through the Faraday rotator 16, while being reflected for a second time at the rotating disc 1. At this point, the direction of polarisation is such that radiation 4' is able to pass through the roof reflector 14.

Alternatively, the Faraday rotator 16 may be replaced with a millimetre wave birefringent surface, such as a Meander-line. For incident plane polarised radiation, which may be resolved into two perpendicular components each oriented at ρ/4 (45°) to the direction of polarisation of the incident beam, a meander line may be constructed to introduce a 90° (ρ/2) phase shift between the two perpendicular components. A 90° (ρ/2) phase shift is therefore introduced in the state of polarisation of radiation each time radiation passes through the Meander-line. Further details relating to Meander-lines may be found in the following references; L. Young et al., *IEEE Transactions on Antennas and Propagation*, vol AP-21, pp 376–378, May 1973, and R-S Chu et al., IEEE Transactions on Antennas and Propagation, vol AP-35, No 6, pp 652–661, June 1987.

Having passed through the roof reflector 14, plane polarised radiation incident on the Meanderline is therefore circularly polarised. The circularly polarised radiation is reflected from the rotating disc 1 and passes back through the meander line to the polarising roof reflector 14 where it is reflected on the first pass, back through the Meander-line and the reflective disc, but is transmitted on the subsequent pass.

In practice, a number of Meander-lines may need to be used in a stacked configuration to give the required ρ/2 phase shift between the two axes. The Meander-lines may be more suitable for use in millimetre wave imaging at the long wavelength end of the wave band (e.g. 35 GHz).

The path of output radiation 4' reflected from the scanning apparatus is separated from the input radiation 4 using an inclined flat polariser 17 and an additional 45° Faraday rotator 18. Output radiation 4' is therefore separated from the path of input radiation 4 and is directed to the collection optics 5 of the imaging system. In this configuration, it is essential that the polariser 17 reflects radiation at substantially 45° to the direction of polarisation transmitted by the two polarisers 15a,15b (i.e. at 45° to the apex 11). When using this roof reflector 14 the direction of the scan at the imager is parallel to the line of intersection 12 of the two polarisers 14a, 14b of the roof reflector 15. In this configuration, the imaging system will detect a single polarisation state only.

Although it is preferable to separate the path of input radiation 4 from the path of output radiation 4', in some operating configurations it may not be essential and the polariser 17 and the Faraday rotator 18 may therefore be omitted from the apparatus shown in the FIG. 6.

Figure 7:
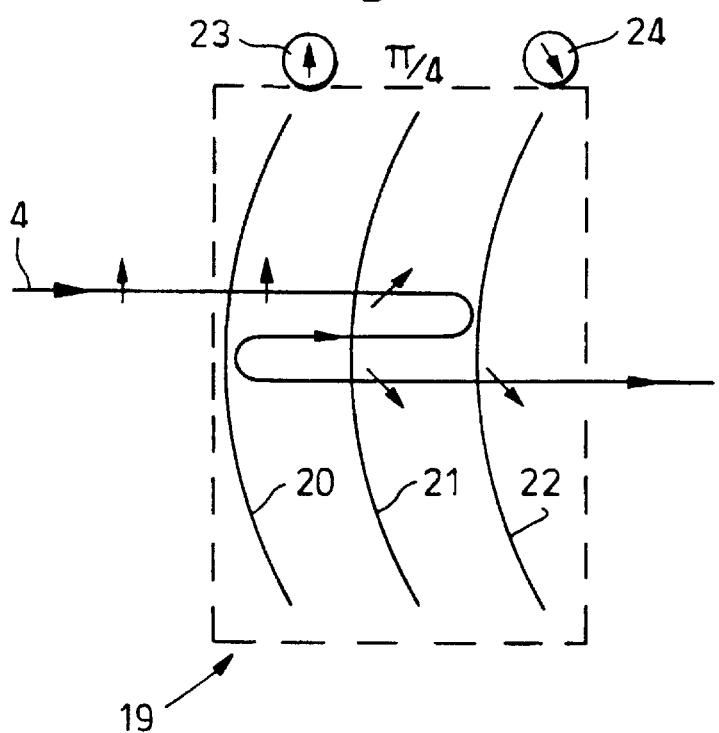
FIG. 7 shows a schematic diagram of a reflector lens which may be used in the scanning apparatus.
Figure 8:
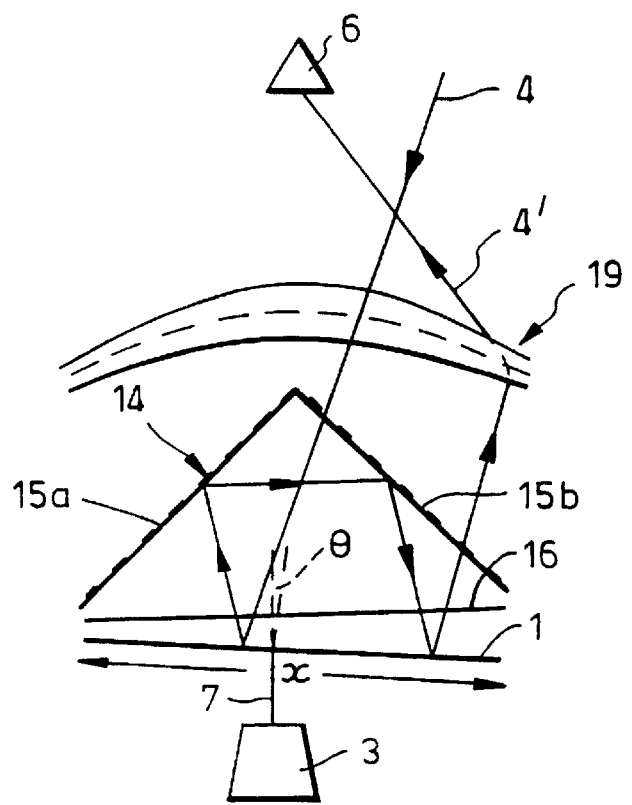
FIG. 8 shows a diagram of a one disc scanning system, including the polarisation sensitive reflector lens in FIG. 7.

FIG. 8 is a modification of FIG. 6 and includes powered optical components to enable focused radiation to be passed directly to the receiver 6. For example, FIG. 7 shows a reflector lens 19 which may be included in the scanning apparatus. The reflector lens 19 comprises three elements; two polarising elements 20,22 (alternatively referred to as polarising reflectors) and a Faraday rotator 21 which rotates the plane of polarisation of radiation passing through by 45°. The arrows 23,24 indicate the direction of polarisation of radiation transmitted by the elements 20 and 22 respectively.

For the purpose of this description, the elements 20,21,22 may also be referred to as surfaces 20,21,22. Although the surfaces 20,21,22 are illustrated in FIG. 7 as having curved surfaces, this is not essential. For example, at least one of the surfaces 20,21,22 may have a substantially planar surface.

The arrows shown along the path of radiation 4 indicate the direction of polarisation as the radiation is transmitted through the reflector lens 19. Radiation 4 is incident on the first element 20 where one direction of polarisation is transmitted (i.e. radiation having a its direction of polarisation vertically in the plane of the paper). Radiation transmitted by the first element 20 passes through the second element 21 which rotates the direction of polarisation by 45°. For example, the second element may be a 45° Faraday rotator. The polarisation of radiation incident at the third element 22 is perpendicular to the polarisation state which is transmitted by the surface 20 and is therefore reflected. On the return path, radiation undergoes a further rotation of 45° in its direction of polarisation as it passes through the second element 21. The direction of polarisation is now perpendicular to the transmission axis of the first element 20 and so the radiation is reflected. The reflected beam undergoes a further rotation of 45° as it passes through the second element 21 and its polarisation is such it is then transmitted, and output from the reflector lens 19, by the third element 22. Hence, the operation of the lens arrangement 19 is such that one polarisation passes through the lens without any focussing effect but when the same polarisation passes through a second time, on the return path, it is focussed. The non-recipirocal nature of the lens is achieved by using a Faraday rotator inside the arrangement.

FIG. 8 shows the still more compact scanning apparatus, including the reflector lens 19 shown in FIG. 7. The reflector lens 19 is situated directly in front of the roof reflector 14. If the surfaces of 20,21,22 are of appropriate shape, radiation transmitted through the reflector lens 19 will be focused. Incoming radiation 4, having the correct direction of polarisation, is transmitted through the reflector lens 19 and suffers no deviation while outgoing radiation 4' is focused directly to the receiver 6.

Figure 9:
FIG. 9 shows a one disc scanning system employing a plurality of roof reflector elements.
Figure 9:
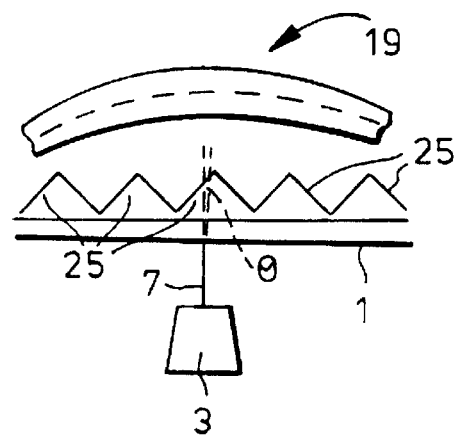

When the polarising roof reflector 14 is employed, the beam of radiation incident on the rotating disc 1 undergoes a considerable displacement along the length of the rotating disc 1. Referring to FIG. 9, it is possible to replace the single roof reflector 14 with a series of roof reflectors 25 of smaller dimension so that upon reflection from the rotating disc 1 radiation is displaced by a reduced amount (the path of radiation is not shown for clarity), therefore reducing the size of the scanning apparatus still further. Again, the reflector lens 19 may be used to focus outgoing radiation 4' directly to the receiver 6.

Figure 10:
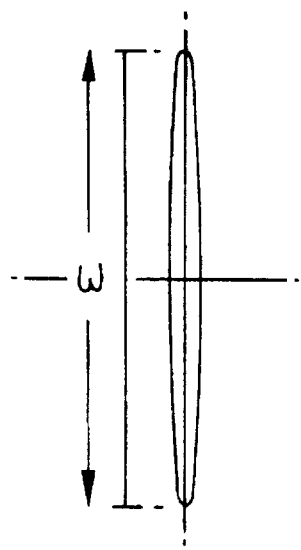
FIG. 10 shows a near linear open scan pattern.

The rotating disc 1 in FIG. 9 may be slightly concave. In this case, it is possible to achieve the near linear open scan pattern shown in FIG. 10. This open scan pattern enables the number of television lines obtained with the scan pattern in FIG. 2(b) to be doubled. For example, for a detector array comprising a number of detector elements separated by a pitch distance, d, matching the width, w, of the open scan pattern to half of the detector pitch, d, enables an interlaced pattern to be obtained. Hence the maximum spatial frequency performance may be achieved. This is analogous to the microscan technique used in infrared imaging [D.J Bradley and P.N. J Denis, "*Sampling effects in HgCdTe focal plane arrays in IR technology and applications*" (Ed. L.R. Baker and A. Mason), *Proc. SPIE* vol 590 pp 53–60 (1985)].

The use of multiple roof reflectors in the arrangement of FIG. 9 can introduce phase changes which impair the spatial resolution of the imager. It may therefore be preferable to sacrifice the benefit of the reduced size of the apparatus in FIG. 8 and to use only a single roof reflector, as shown in FIG. 8. However, the configuration shown in FIG. 8 can lead to pupil wander due to the displacement of an incoming beam 4 by the disc 1 and the roof reflector 15a, 15b arrangement and therefore the effective pupil area of the system is reduced.

Figure 11:
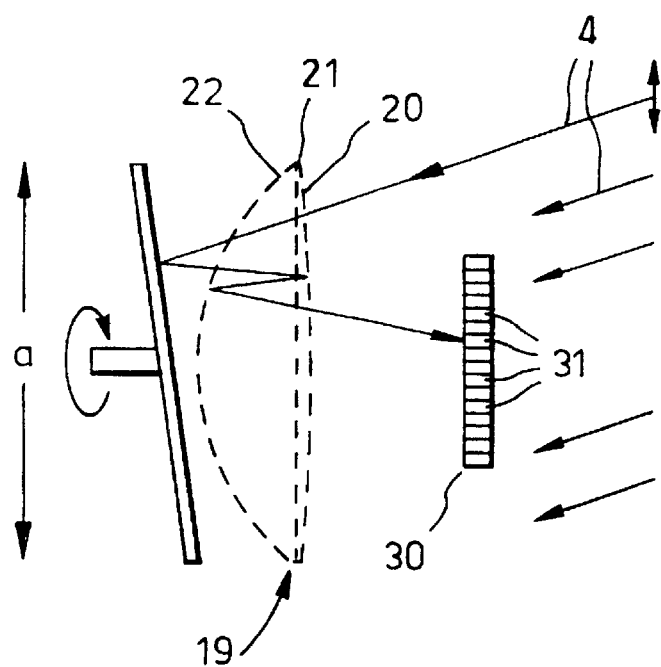
FIG. 11 shows an embodiment of the apparatus which may be used to provide a conical scan pattern and FIG. 12 shows the scan pattern which may be achieved using the apparatus shown in FIG. 11.

The apparatus may also be configured to provide a conical scanning system, rather than a raster scan. One configuration for achieving this is shown in FIG. 11. This arrangement provides advantages over the apparatus shown in FIG. 8 in that it is more compact and does not give rise to pupil wander. It also has a much improved spatial resolution over the apparatus. of FIG. 9.

The arrangement shown in FIG. 11 comprises a detector array 30 having a number of detector elements 31, a reflector lens 19, and a rotating plate or disc 1. The disc 1 typically rotates about an axis passing through its centre at an angle of inclination of a few degrees to the normal to the axis, say 5°, as described previously. The reflector lens 19 has the structure described with reference to FIG. 7 and comprises a polarising reflector element 20 (e.g. a vertical wire grid), a 45° Faraday rotator 21 and a polarising reflector element 22 (e.g. a 45° wire grid). The elements may have curved surfaces as shown in FIG. 7. Alternatively, one or two of the elements may have a plane surface.

The operation of the reflector lens 19 is such that incident radiation 4 of one polarisation, in this case horizontal polarisation, passes through the lens arrangement without any focussing effect, as described previously, whereas on passing through the lens for a second time, from the opposite direction, it is focussed.

Figure 12:
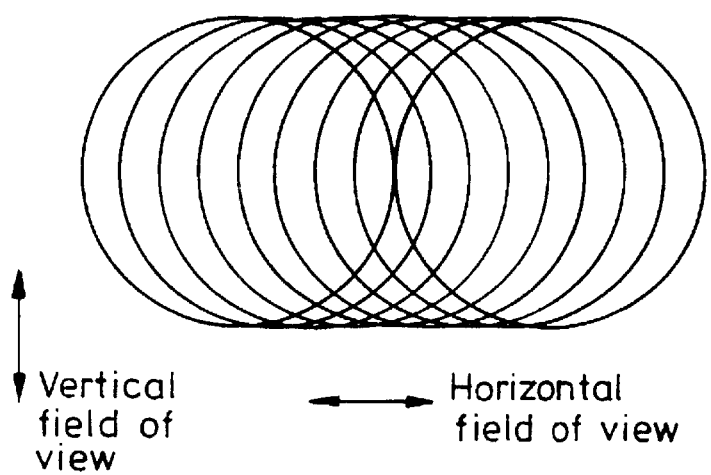

A single detector element 32 in the detector array 30 traces out a circular scan pattern. As the detector elements 31 lie adjacent to one another, the image formed is a series of displaced circles, as shown in FIG. 12. As the reflector lens 19 can be placed between the detector array 30 and the rotatable disc 1 the scanning system is compact. In conventional arrangements, scanning optics have to be located apart from the focussing components which can make such systems inconveniently large.

In a particular embodiment of the arrangement shown in FIG. 11, the polarising element 20 may have a substantially flat surface and the polarising element 22 may have a substantially spherical surface, this spherical surface having a radius of curvature R and thus a focus at a distance R/2 from the spherical surface. In this embodiment, the elements 31 of the detector array 30 form part of a spherical surface having half the radius of curvature (R/2) of polarising element 22 and being concentric with it. The detector elements 31 may be fed by horns in which case the apparatus is arranged such that the focus (i.e. at R/2) of polarising element 22 is located within the dimension of the horn. As a further refinement, a corrector plate may be placed between the rotatable disc 1 and the polarising element 22 to remove spherical aberrations from the image formed at the detector array 30.

In any of the arrangements shown in FIGS. 8, 9 or 11 two or more reflector lenses 19 may be included in series.

For some applications the conical scanning apparatus shown in FIG. 11 may be preferred over the FIG. 8 and 9 configurations, even at the expense of the more complex conical scan pattern. In practice, the preferred configuration of the apparatus will depend on the particular application for which it is to be used.

Whilst the scanning apparatus has been described with reference to millimetre wave imaging in particular, it may also be applicable to other radiometry systems. The technique of transmitted high powered radio waves to a scene and analysing radiation transmitted back to a radar receiver is well known. For example, by scanning radiation transmitted back to the radar receiver using the scanning apparatus, the need for large, moveable receiver elements employed in radar systems is removed. The input radiation to the scanning apparatus is therefore the radiation reflected from the scene which is transmitted to the scene by the radar transmitter. For the purpose of this specification the phrase "radiation from a scene" shall therefore be taken to mean radiation emitted by, reflected from or transmitted from a scene.

What is claimed is:

1. An apparatus for scanning radiation from a scene and for generating output radiation for input to a receiver system comprising;
   a first rotatable reflective plate, for receiving and reflecting radiation, having an axis of rotation passing substantially through the centre of the plate, wherein the axis of rotation is inclined at a non-zero angle θ$a$ to the normal to the reflective plate,
   rotary means for rotating the reflective plate,
   secondary reflection means for receiving and reflecting radiation and
   static reflection means for receiving radiation reflected from the first rotatable reflective plate and reflecting radiation towards the secondary reflection means,
   characterised in that the secondary reflection means is a second rotatable reflective plate having a common axis of rotation with the first rotatable reflective plate, wherein the common axis of rotation is inclined at a non-zero angle θ$b$ to the normal to the second reflective plate.

2. The apparatus of claim 1, and also including a millimetre wavelength imaging camera.

3. The apparatus of claim 1, and also including a radar receiver.

4. The apparatus of claim 1, wherein the normals to the first and second reflective plates are inclined in substantially the same plane and at substantially equal angles to the common axis of rotation and in substantially opposite directions.

5. The apparatus of claim 4 wherein the angles of inclination θ$a$, θ$b$ are between 1° and 10°.

6. The apparatus of claim 4 wherein the static reflection means comprise a plane mirror having a reflective surface substantially parallel to the common axis of rotation.

7. The apparatus of claim 1, wherein the secondary reflection means is the first rotatable reflective plate.

8. The apparatus of claim 7 wherein the axis of rotation is inclined at an angle of between 1° and 10° to the normal to the reflective plate.

9. The apparatus of claim 7 wherein the static reflection means include two reflective surfaces inclined at substantially 90° to each other.

10. The apparatus of claim 9 wherein the two reflective surfaces form a roof reflector and are in contact along an apex.

11. The apparatus of claim 9 and further comprising a polarising mirror arranged to reflect output radiation to the receiver system.

12. The apparatus of claim 11 wherein the polarising mirror is a sheet of plastic material comprising a plurality of parallel conducting wires, wherein the parallel conducting wires are oriented at substantially 45° to the apex of the roof reflector.

13. The apparatus of claim 7 wherein the static reflection means include two polarisers, each having a polarisation axis, wherein said polarisers are inclined at substantially 90° to each other.

14. The apparatus of claim 13 wherein two polarisers form a polarising roof reflector and are in contact along an apex,
   wherein the polarisation axes of the polarisers are oriented to transmit radiation having substantially the same direction of polarisation wherein the direction of polarisation is substantially parallel or substantially perpendicular to the apex.

15. The apparatus of claim 7 wherein the static reflection means comprise a plurality of polarising roof reflectors, each comprising two polarisers and each polariser having a polarisation axis, wherein the polarisers are inclined at substantially 90° to each other and are in contact along an apex,
   wherein the polarisation axes of the polarisers forming each roof reflector are oriented to transmit radiation having substantially the same direction of polarisation wherein said direction of polarisation is substantially parallel or substantially perpendicular to the apexes.

16. The apparatus of claim 14, and further comprising a first Faraday rotator, situated between the polarising roof reflector and the rotatable reflective plate, for rotating the direction of polarisation of radiation through substantially 45° each time the radiation passes through the Faraday rotator,
   such that the radiation having a particular direction of polarisation may be output through the polarising roof reflector.

17. The apparatus of claim 14, and further comprising;
   one or more birefringent surfaces situated between the polarising roof reflector and the rotatable reflective plate, for receiving radiation in a state of polarisation, $P_s$,
   whereby the one or more birefringent surfaces introduce a substantially 90° phase shift in the state of polarisation, $P_s$ each time radiation passes through the one or more birefringent surfaces, such that radiation having a particular direction of polarisation may be output through the polarising roof reflector.

18. The apparatus of claim 17, wherein the one or more birefringent surfaces are Meander-lines.

19. The apparatus of claim 15, and further comprising means for selectively transmitting radiation input to the apparatus having a particular direction of polarisation and for selectively reflecting radiation output from the apparatus having a particular direction of polarisation.

20. The apparatus of claim 19 comprising;
   a second Faraday rotator for rotating the direction of polarisation of radiation output from the polarising roof reflector through substantially 45°
   and also comprising a second polariser, wherein the second polariser has an axis of polarisation inclined at substantially 45° to the apex or apexes of the one or more polarising roof reflectors.

21. The apparatus of claim 7, comprising a lens arrangement for selectively transmitting and focusing radiation having a particular direction of polarisation.

22. The apparatus of claim 21 wherein the lens arrangement is a reflector lens comprising;
   a first polarising surface having a polarisation axis, for selectively transmitting and selectively reflecting radiation having a particular direction of polarisation,
   a second surface for rotating the direction of polarisation of radiation through substantially 45° and
   a third polarising surface for selectively reflecting and selectively transmitting radiation, wherein the third polarisation axis makes an angle of substantially 45° with the first polarisation axis.

23. The apparatus of claim 21 comprising two or more lens arrangements arranged in series.

24. The apparatus of claim 7, wherein the static reflection means form part of the lens arrangement, the apparatus being arranged to provide a conical scanning apparatus.

25. The apparatus of claim 24, wherein the first polarising surface has a substantially flat surface and the third polarising surface has a substantially spherical surface having a radius of curvature, R, and also comprising a detector array forming part of a spherical surface having half the radius of curvature of the spherical surface of the third polarising surface and being concentric with it.

26. The apparatus of claim 25, and further comprising a corrector plate located between the rotatable disc and the third polarising surface for removing spherical aberrations from an image formed at the detector array.

27. A reflector lens comprising;

a first polarising surface having a polarisation axis, for selectively transmitting and selectively reflecting radiation having a particular direction of polarisation, a second surface for rotating the direction of polarisation of radiation through substantially 45° and a third polarising surface for selectively reflecting and selectively transmitting radiation, wherein the third polarisation axis makes an angle of substantially 45° with the first polarisation axis.

28. The reflector lens of claim 27, wherein at least one of the first, second or third surfaces has a curved surface.

* * * * *